United States Patent [19]
Yoshitsugu et al.

[11] Patent Number: 4,585,251
[45] Date of Patent: Apr. 29, 1986

[54] SEATBELT SYSTEM

[75] Inventors: Noritada Yoshitsugu; Masakazu Hashimoto; Yutaka Matsuzaki, all of Toyota, Japan

[73] Assignee: Toyota Jidosha Kabushiki Kaisha, Aichi, Japan

[21] Appl. No.: 665,522

[22] Filed: Oct. 26, 1984

[30] Foreign Application Priority Data

Nov. 28, 1983 [JP] Japan .................. 58-183304[U]

[51] Int. Cl.$^4$ .................................. B60R 21/02
[52] U.S. Cl. ........................ 280/804; 297/468
[58] Field of Search ............ 280/802, 804; 297/468, 297/469

[56] References Cited
U.S. PATENT DOCUMENTS 4,321,979 3/1982 Kuroyama .................. 280/804
4,322,096 3/1982 Higbee et al. ................ 280/804
4,343,489 8/1982 Suzuki et al. ................ 280/804
4,365,827 12/1982 Takada ....................... 280/804

FOREIGN PATENT DOCUMENTS 42817 11/1976 Japan .
26019 7/1978 Japan .

Primary Examiner—Richard A. Bertsch
Attorney, Agent, or Firm—Parkhurst & Oliff

[57] ABSTRACT

A seatbelt system automatically fastens a webbing to an occupant of a vehicle after he has entered the vehicle and seated in a seat. The wind-up force of a webbing retractor for winding up the webbing is temporarily reduced by a control means in the course of the operation for fastening the webbing to the occupant. Thus, it is possible to eliminate the possibility that the webbing may rub against the body of the occupant during the operation for automatically fastening the webbing to the occupant.

13 Claims, 18 Drawing Figures

SEATBELT SYSTEM

BACKGROUND OF THE INVENTION

1. Field of the Invention

The present invention relates to seatbelt systems for restraining an occupant of a vehicle to prevent movement of the occupant. More particularly, the invention pertains to a seatbelt system capable of automatically fastening a restraining webbing to the occupant after he is seated.

2. Description of the Prior Art

A typical conventional seatbelt system is arranged such that an occupant of a vehicle is fastened with a restraining webbing and is restrained by the webbing.

In order to automatically fasten the restraining webbing to the occupant after he has seated himself in a vehicle, a seatbelt system has been proposed which is arranged such that one end (hereinafter referred to as the "outer end") of the webbing is secured to a driving gear so that the outer end of the webbing is moved toward the front or rear end of the vehicle when the occupant enters or leaves the vehicle such as to allow the webbing to be automatically fastened to or unfastened from the occupant. In this type of seatbelt system, the portion of the webbing at the end (hereinafter referred to as the "inner end") which is opposite to the outer end portion thereof secured to the driving gear is wound up by means of a bias into a webbing retractor which is mounted on a floor member of the vehicle.

The seatbelt system of the type described above, however, encounters the following problem. When the outer end of the webbing is moved toward the rear end of the vehicle, the inner end of the webbing may excessively be wound off from the webbing retractor near the end point of the webbing moving stroke, thus causing an intermediate portion of the webbing to rub against the body of the occupant.

Examples of seatbelt systems capable of automatically fastening the restraining webbing to the occupant include those shown in the specifications of U.S. Pat. No. 4,343,489, Japanese Patent Publication No. 42,818/1976 and Japanese Patent Publication No. 26,019/1978.

SUMMARY OF THE INVENTION

In view of the above-described problem, a primary object of the present invention is to provide a seatbelt system including a webbing which has one end thereof secured to a driving gear and is automatically fastened to or unfastened from an occupant of a vehicle when the occupant enters or leaves the vehicle, the seatbelt system being capable of reducing the frictional resistance occurring between the webbing and the body of the occupant when the webbing is moved.

To this end, according to the invention, there is provided a seatbelt system in which a webbing takeup shaft, which is mounted on a floor member of a vehicle and is adapted to wind up the other end of an occupant restraining webbing, is biased to rotate in the webbing wind-up direction by means of a resilient member, and when the tension of the webbing being moved toward the rear side of the vehicle exceeds a predetermined value, a control means reduces the biasing force of the resilient member so that the webbing tension is decreased, thereby reducing the frictional resistance occurring between the webbing and the body of the occupant when the webbing is moved.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
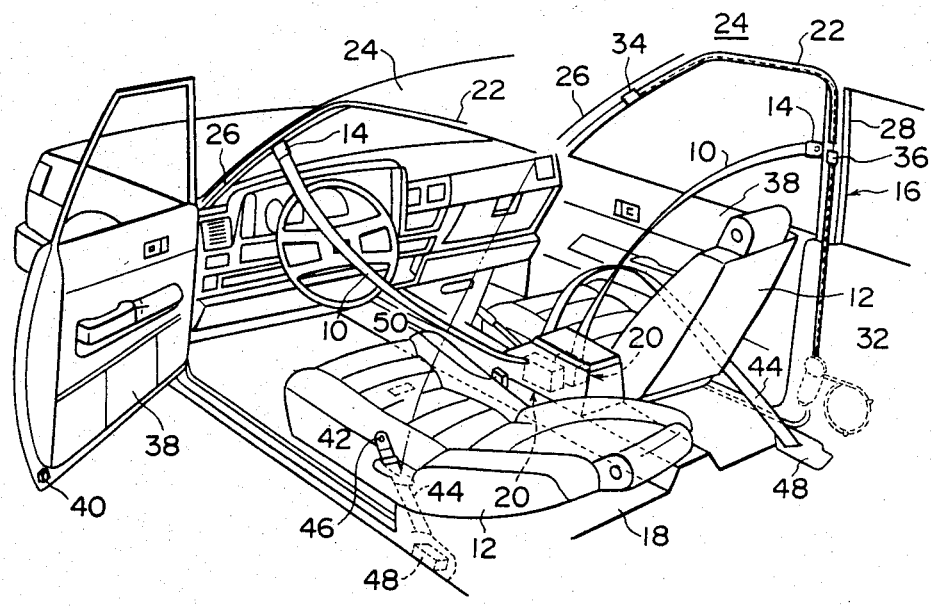
FIG. 1 is a perspective view of an automobile showing a first embodiment of the seatbelt system in accordance with the present invention.

FIG. 1 shows an automobile to which the seatbelt system in accordance with an embodiment of the present invention is applied. This embodiment is arranged such that shoulder webbings 10 are automatically fastened to respective occupants as they seat themselves in seats 12.

More specifically, the end portion of each shoulder webbing 10 on the side thereof which is closer to the outside of the vehicle is secured to a driving gear 16 through a shoulder anchor 14. On the other hand, the end portion of each shoulder webbing 10 on the inner side of the vehicle is wound up into a webbing retractor 20 which is mounted on a floor member 18 in a central portion of the vehicle. Each shoulder anchor 14 may be of a structure which allows the corresponding shoulder webbing 10 to be released therefrom, if necessary.

The driving gears 16 are provided so as to respectively correspond to the driver's seat and the passenger's seat. Guide rails 22 are respectively disposed along the side walls of the vehicle body and are adapted to guide the corresponding shoulder anchors 14 so that the shoulder anchors 14 are movable toward the front or rear end of the vehicle. Each of the guide rails 22 has a structure such as that shown in FIG. 3. More specifically, the central portion of the guide rail 22 is horizontally fixed to a roof-side rail 24; the front end of the guide rail 22 extends obliquely downward along a front pillar 26; and the rear end of the guide rail 22 extends vertically downward along a center pillar 28.

Figure 4:
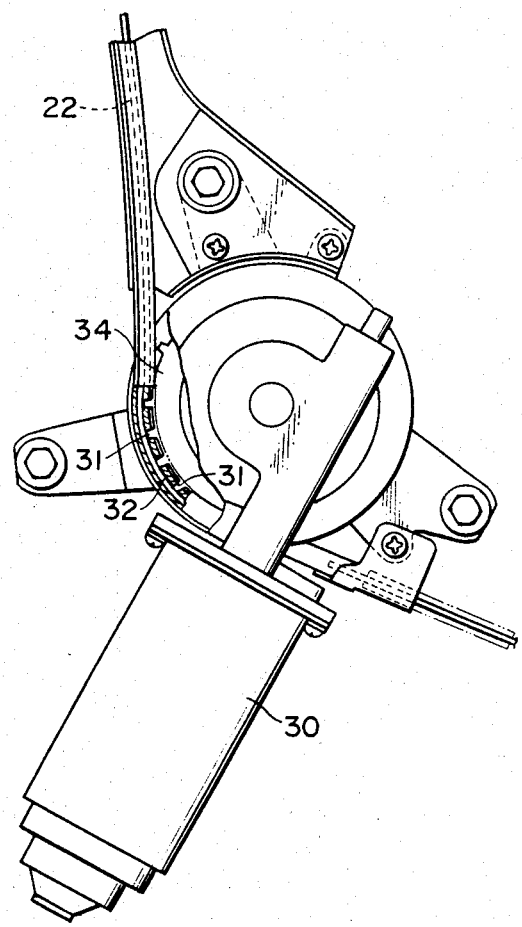
FIG. 4 is a partially cutaway enlarged view of an essential part of the driving gear shown in FIG. 3.
Figure 5:
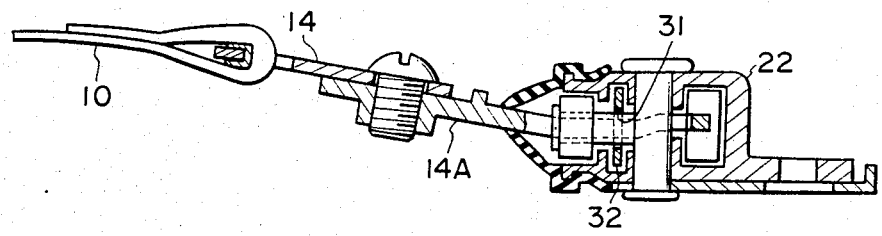
FIG. 5 is a sectional view taken along the line V—V of FIG. 3.
Figure 6:
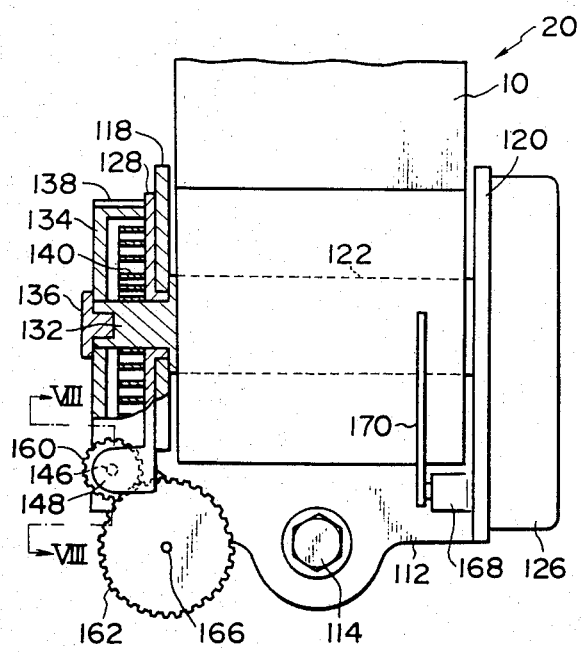
FIG. 6 is a front elevational view of a webbing retractor employed in the first embodiment.

As shown in FIGS. 4 and 5, to the shoulder anchor 14 and a connecting plate 14A which are guided by the guide rail 22 is attached one end of a flexible tape 32 having a plurality of bores 31 formed therein along the longitudinal direction thereof. The portion of the tape 32 at the other end thereof is engaged with a sprocket 31 which is driven by a motor 30 disposed at the lower portion of the center pillar 28. Thus, as the motor 30 rotates, a compressive or tensile force is applied to the tape 32, whereby the shoulder anchor 14 is moved along the guide rail 22 toward the front or rear side of the vehicle.

The guide rail 22 has limit switches 34, 36 respectively attached to the front and rear ends thereof, thereby allowing the moving state of the shoulder anchor 14 to be detected.

The motor 30 is adapted to be driven so as to move the shoulder anchor 14 toward the rear side of the vehicle when the fact that an occupant has entered the vehicle and has seated himself in the seat 12 is confirmed by a detection signal delivered from a door switch 40 (see FIG. 1) which is mounted on to a door 38 (or the vehicle body) for detecting the opening or closing of the door 38 and by a detection signal delivered from a limit switch 42 which is disposed in the sitting portion of the seat 12 for detecting whether or not an occupant has seated himself therein. On the other hand, when the fact that the occupant is leaving the car is detected from opening of the door 38 or other action, the motor 30 is rotated backwardly to move the shoulder anchor 14 toward the front side of the vehicle.

Figure 2:
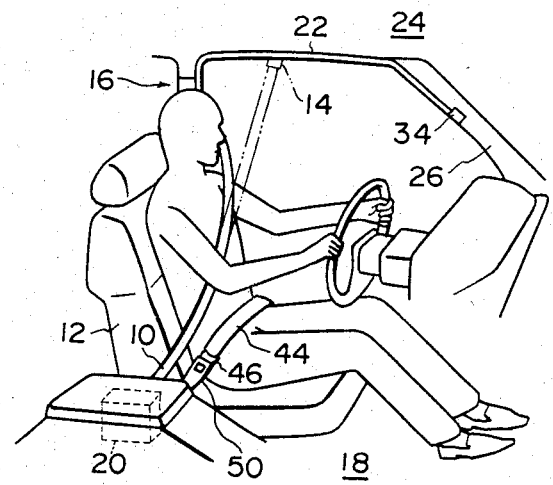
FIG. 2 is a perspective view of the automobile shown in FIG. 1, as viewed from the inside of the compartment thereof, particularly showing how an occupant restraining webbing is fastened to an occupant.

Further, a lap webbing 44 is disposed on the floor member 18 on the side of each seat 12 which is closer to the outside of the vehicle. The lap webbing 44 has a tongue plate 46 secured to the distal end portion thereof. The proximal portion of the lap webbing 44 is wound up by a bias into a webbing retractor 48 which is mounted on the floor member 18. A buckle device 50 is attached to the side of each seat 12 which is on the inner side of the vehicle such as to correspond to the tongue plate 46. As shown in FIG. 2, an occupant seated in the seat 12 manually winds off the lap webbing 44 from the webbing retractor 48 and engages the tongue plate 46 with the buckle device 50, thereby allowing the occupant to be fastened with the lap webbing 44. It is to be noted that the webbing retractor 48 incorporates therein an inertial locking mechanism which abruptly stops the wind-off of the lap webbing 44 in an emergency situation of the vehicle.

Next, the webbing retractor 20 is explained with reference to FIGS. 6 to 10.

The webbing retractor 20 for winding up the shoulder webbing 10 has a frame 112 which is secured to the floor member 18 by means of a bolt 114.

The frame 112 has a pair of leg plates 118, 120 which are extended from both side portions thereof so as to be in parallel to each other.

These leg plates 118, 120 rotatably support the corresponding end portions of a takeup shaft 122. At an intermediate portion of the takeup shaft 112 one end of the shoulder webbing 10 is retained, and the shoulder webbing 10 is wound up in layers from the one end.

On the outside of the leg plate 120, an inertial locking mechanism 126 is mounted between the leg plate 120 and the takeup shaft 122. The inertial locking mechanism 126 has a structure which is generally employed and is adapted to abruptly stop the rotation of the takeup shaft 122 for winding off the webbing 10 in a vehicular emergency by detecting an acceleration of the vehicle body or an acceleration of wind-off of the shoulder webbing 10.

A plate-like holder 128 is secured to the outside of the leg plate 118 by means of screws 130. A smaller-diameter portion 132 formed at the end portion of the takeup shaft 122 extends through the holder 128. A spring casing 134 is rotatably supported at its bottom plate portion by the distal end portion of the smaller-diameter portion 132. The spring casing 134 is prevented from coming off from the smaller-diameter portion 132 by means of a stopper 136 which is press-fitted into the distal end portion of the smaller-diameter portion 132.

Further, the spring casing 134 is formed on the outer peripheral portion thereof with a worm wheel 138 and retains at the inner peripheral portion thereof the outer end of a spiral spring 140. The spring 140 is disposed such as to be coaxial with the smaller-diameter portion 132 and has its inner end retained by the smaller-diameter portion 132. Accordingly, the spiral spring 140 is adapted to apply a force to the takeup shaft 122 for winding up the webbing 10. In addition, as the spring casing 134 is rotated in the direction of the arrow d in FIG. 7, the spiral spring 140 increases its biasing force to increase the force applied to the takeup shaft 122 in the webbing wind-up direction. On the other hand, when the spring casing 134 is rotated in the direction of the arrow D in FIG. 7, the spiral spring 140 decreases its webbing wind-up biasing force.

Figure 8:
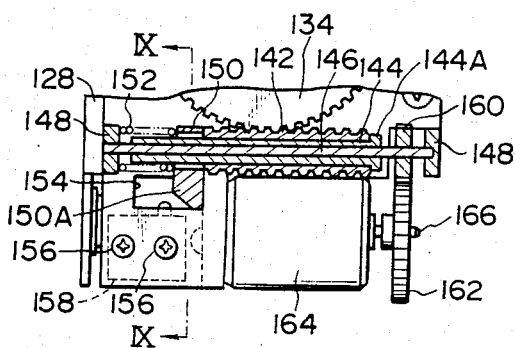
FIG. 8 is a sectional view taken along the line VIII—VIII of FIG. 6.
Figure 9:
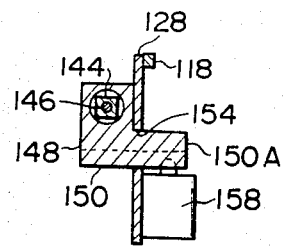
FIG. 9 is a sectional view taken along the line IX—IX of FIG. 8.

A worm 142 meshing with the worm wheel 138 is, as shown in FIG. 8, rotatably supported at brackets 148 of the holder 128 through a guide 144 and a shaft 146. More specifically, the guide 144 is secured to an intermediate portion, in the axial direction, of the shaft 146 which is rotatably supported at both end portions thereof by the brackets 148, such as to rotate with the shaft 146. The guide 144 has a rectangular outer configuration as shown in FIG. 9. The worm 142 is formed at its axial central portion with a rectangular bore through which the worm 142 fits with the guide 144. Accordingly, the worm 142 rotates with both the guide 144 and the shaft 146 and is still allowed to axially move relative to the guide 144 and the shaft 146.

The relative movement of the worm 142 is restricted, by a larger-diameter portion 144A formed at one end (in the axial direction) of the guide 144, in one of the axial directions of the worm 142, namely, the direction in which the worm 142 receives a repulsion force of the spiral spring 140 through the spring casing 134. Further, the guide 144 rotatably supports an actuator 150 through the worm 142 near the end portion thereof which is opposite to the larger-diameter portion 144A. The actuator 150 is, as shown in FIG. 9, provided with a circular bore for receiving the guide 144, thereby allowing the actuator 150 to rotate relative to the guide 144. The actuator 150 is further provided with a compression coiled spring 152 interposed between the same and the bracket 148 of the holder 128 so as to be brought into resilient contact with the worm 142, thus enabling the actuator 150 to move with the worm 142 in the axial direction of the shaft 146.

Figure 10:
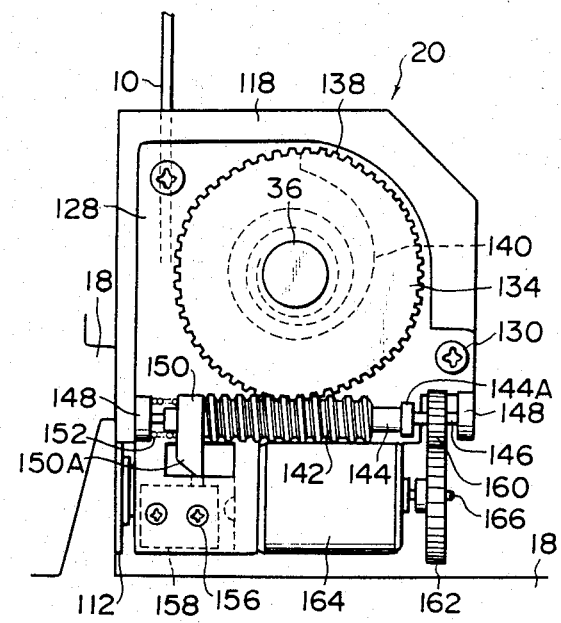
FIG. 10 is an illustration showing the operation of the webbing retractor shown in FIG. 7.

FIG. 8 shows the worm 142 and the actuator 150 in the state wherein these elements have moved until they abut against the larger-diameter portion 144A, while FIG. 10 shows the worm 142 and the actuator 150 in the state wherein they have maximumly moved in the direction opposite to that moved in FIG. 8 against the biasing force of the compression coiled spring 152.

The actuator 150 has, as shown in FIG. 9, its leg portion 150A extending through an opening 154 formed in the holder 128 so as to be opposed to a limit switch 158 which is mounted on the opposite side of the holder 128 by means of screws 156. The limit switch 158 is OFF when it is separate from the actuator 150 as shown in FIG. 8 and is ON when it is in contact with the leg portion 150A of the actuator 150 as shown in FIG. 10.

The shaft 146 has a pinion 160 secured to the portion thereof near the larger-diameter portion 144A. The pinion 160 is meshed with a gear 162. The gear 162 is secured to an output shaft 166 of a motor 164 secured to the holder 128.

The leg plate 120 has a webbing wind-off amount detection switch 168 mounted on the inner side thereof. The webbing wind-off amount detection switch 168 has a pivoting arm 170 projecting therefrom. The distal end portion of the pivoting arm 170 is biased to abut against the outer periphery of the portion of the shoulder webbing 10 wound up on the takeup shaft 122 in layers. Thus, the webbing wind-off amount detection switch 168 is able to detect whether or not the diameter of the portion of the shoulder webbing 10 wound up on the takeup shaft 122 is below a predetermined value.

Figure 11:
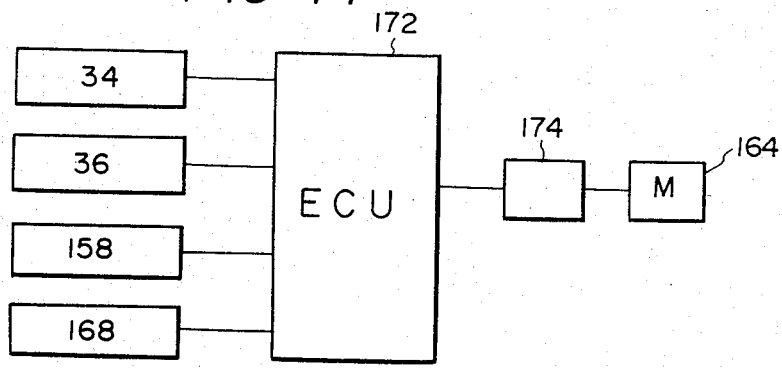
FIG. 11 is a diagram of a control circuit employed in the first embodiment.

FIG. 11 shows a control circuit for controlling the motor 164. This control is effected such that the motor 164 is actuated through a relay 174 by a control unit 172 having a microcomputer as its main component.

To the control unit 172 are transmitted the respective outputs of the limit switches 34, 36 on the guide rail 22, the limit switch 158 on the webbing retractor 20, and the webbing wind-off amount detection switch 168, which have been already described above.

The control unit 172 actuates the motor 164 to rotate through the relay 174 when the following set of conditions is satisfied: the detection signals from the limit switches 34, 36 show the fact that the shoulder anchor 14 is at in intermediate portion of the guide rail 22; the detection signal from the webbing wind-off amount detection switch 168 shows the fact that the amount of the shoulder webbing 10 wound off is below a predetermined value; and the limit switch 158 being ON shows the fact that the tension of the webbing 10 exceeds a predetermined value. Consequently, the spiral spring 140 is rotated in the direction of the arrow D in FIG. 7, whereby the biasing force of the spiral spring 140 can be decreased. The rotation of the motor 164 is suspended when the webbing wind-off amount detection switch 168 detects the fact that the amount of the shoulder webbing 10 wound off exceeds a predetermined value.

Figure 7:
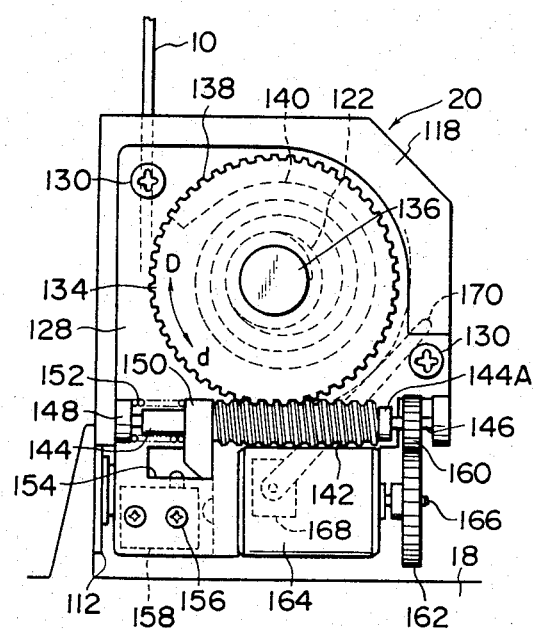
FIG. 7 is a side view of the webbing retractor shown in FIG. 6 as viewed from the left-hand side thereof.

Further, the control unit 172 actuates the motor 164 to rotate in the direction of the arrow d in FIG. 7 thereby increasing the webbing wind-up biasing force when the following set of conditions is satisfied: the detection signals from the limit switches 34, 36 show the fact that the shoulder anchor 14 is at the front or rear end of the guide rail 22; the detection signal from the webbing wind-off amount detection switch 168 shows the fact that the amount of shoulder webbing 10 wound off exceeds a predetermined value; and the limit switch 158 is OFF. In this case, the rotation of the motor 164 is suspended when the limit switch 158 is turned ON.

The following is a description of the operation of the embodiment described above.

FIG. 1 shows the driver's seat in the state wherein the door 16 has already been opened and the shoulder anchor 14 has been moved toward the front side of the vehicle and consequently, an occupant is allowed to seat himself in the seat 12. When the occupant closes the door 16 after seating himself in the seat 12 as shown in FIG. 2, the motor 30 is actuated to move the shoulder anchor 14 toward the rear side of the vehicle, whereby the occupant is automatically fastened with the shoulder webbing 10.

In this case, the motor 164 causes the spiral spring 140 to rotate in the direction in which the biasing force thereof is decreased when the following set of conditions is satisfied: the fact is detected that the shoulder anchor 14 is at in intermediate portion of the guide rail 22; the webbing wind-off amount detection switch 168 detects the fact that the amount of the shoulder webbing 10 wound off is below a predetermined value; and the limit switch 158 being ON shows the fact that the tension of the shoulder webbing 10 exceeds a predetermined value. Such rotation of the spiral spring 140 causes the tension of the shoulder webbing 10 to decrease.

More specifically, according to the prior art, when the shoulder webbing 10 is moved from the position shown by the imaginary line in FIG. 2 toward the rear side of the vehicle, the shoulder webbing 10 is slightly excessively wound off from the webbing retractor 20, which may unfavorably cause the shoulder webbing 10 to rub against the body of the occupant. According to this embodiment, however, the tension of the shoulder webbing 10 is decreased at the time when the above-described set of conditions is satisfied. Therefore, the frictional resistance between the shoulder webbing 10 and the body of the occupant is small so that the occupant may be comfortably fastened with the webbing 10. If necessary, the occupant engages the tongue plate 4 with the buckle device 50 after being fastened with the shoulder webbing 10, whereby the occupant is brought into a three-point webbing fastened state.

Further, when the occupant is in a webbing fastened state, the limit switch 36 has already detected the shoulder anchor 14. In this state, when the limit switch 158 detects the fact that the webbing tension is below a predetermined value, the control unit 172 actuates the motor 164 to wind up the shoulder webbing 10 in order to increase the webbing tension, thereby bringing the webbing 10 into close contact with the occupant. Thereafter, the motor 164 may be rotated backwardly by a slight amount in order to remove from the occupant a sense of oppression by the webbing 10.

When the occupant opens the door 16 in order to leave the vehicle, the motor 30 rotates backwardly, causing the shoulder anchor 14 to move toward the front end of the vehicle. In this case also, the motor 30 operates so as to maintain the shoulder webbing 10 in a state of decreased tension, thereby allowing the occupant to leave the vehicle easily and comfortably. However, decreasing of the webbing tension may be limited at a point when the webbing 10 has moved toward the front end of the vehicle so that the webbing 10 will not become unnecessarily loose.

Further, it is possible not only to selectively employ only the required detection signals input to the control unit 172 in the above-described examples thereof, but also to use other combinations of detection signals.

Figure 12:
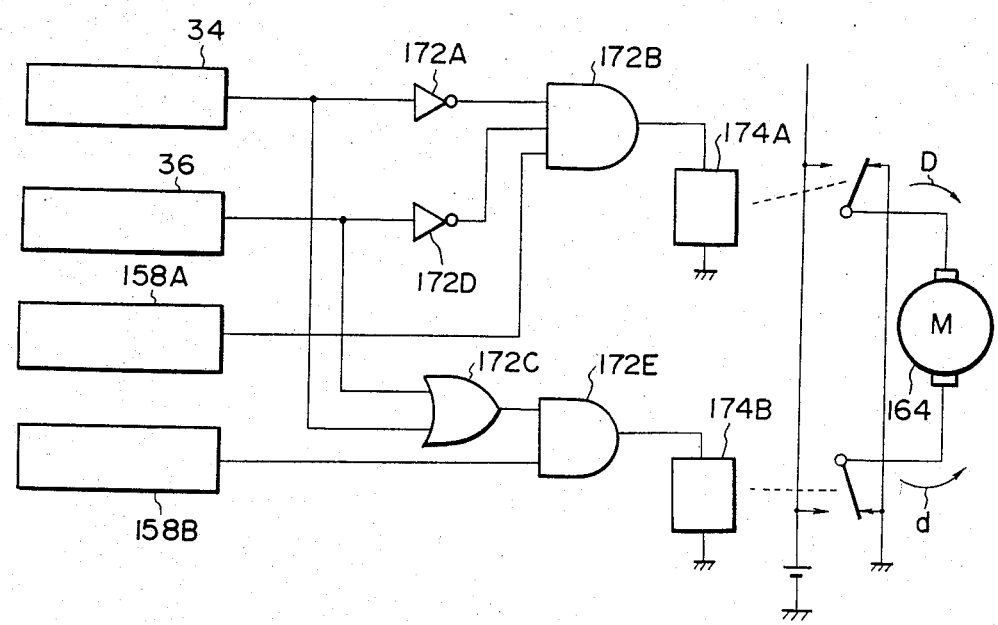
FIG. 12 is a practical circuit diagram in accordance with a second embodiment of the present invention.

FIG. 12 is a diagram of a practical circuit in accordance with a second embodiment of the present invention which is also applicable to the above-described first embodiment.

Figure 3:
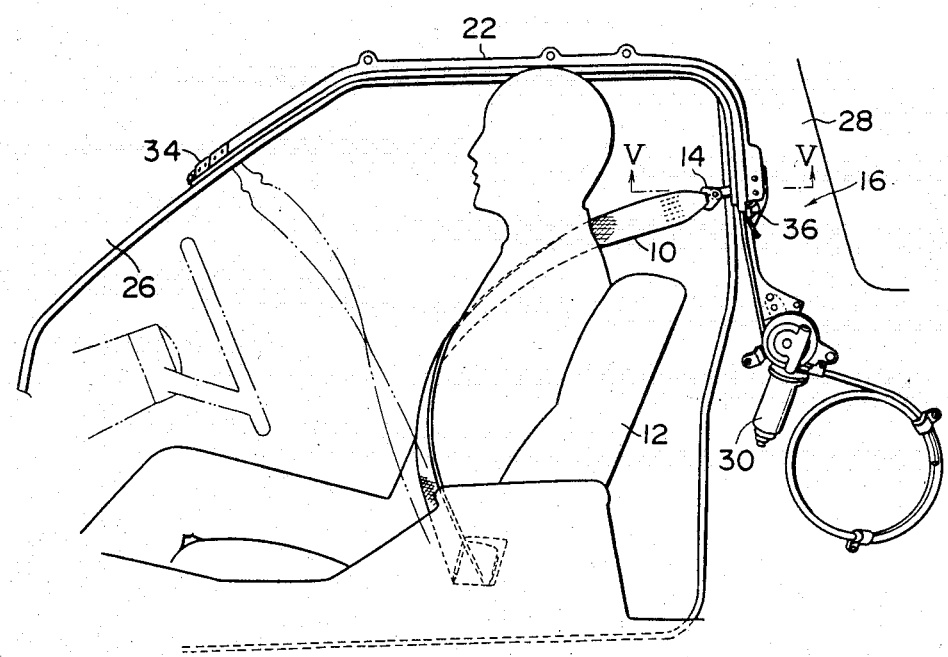
FIG. 3 is a front elevational view of a driving gear.

This circuit also employs the limit switches 34, 36 which are respectively provided at the front end and the rear end of the guide rail 22 (see FIG. 3). The limit switch 34 is adapted to deliver a signal of H (high) level only when it is contacted by the shoulder anchor 14. The output of the limit switch 34 is supplied to an AND element 172B through an inverting element 172A and to an OR element 172C. The limit switch 36 is also adapted to deliver a signal of H level only when it is contacted by the shoulder anchor 14. The output of the limit switch 36 is supplied to the AND element 172B through an inverting element 172D and to the OR element 172C.

Further, this circuit employs limit switches 158A, 158B which are similar to the limit switch 158 shown in FIG. 7. In this case, the limit switch 158A is adapted to deliver a signal of L (low) level only when the webbing tension takes a minimum value which is lower than a predetermined value. The output of the limit switch 158A is supplied to the AND element 172B. On the other hand, the limit switch 158B is adapted to deliver a signal of L level only when the webbing tension takes a maximum value which is higher than a predetermined value. The output of the limit switch 158B is supplied to an AND element 172E, to which the output of the OR element 172C is also supplied. Accordingly, the limit switch 158A is mounted so as to be able to detect the position of the actuator 150 shown in FIG. 7, while the limit switch 158B is disposed in the same condition as the limit switch 158.

These AND elements 172B, 172E are respectively connected to relays 174A, 174B. The relays 174A, 174B are connected to the motor 164, whereby the rotational direction of the motor 164 is determined.

Thus, the operation effected by the elements 172A to 172E and the relays 174A, 174B is similar to that of the control unit 172 in the first embodiment. More specifically, when the shoulder anchor 14 is at an intermediate position between the limit switches 34, 36 and the webbing tension is not minimum, all the inputs to the AND element 172B are at the H level; hence, the relay 174A actuates the motor 164 to rotate in the direction in which the webbing tension is decreased. On the other hand, when the shoulder anchor 14 abuts against either the limit switch 34 or 36 and the webbing tension is not maximum, all the inputs to the AND element 172E are at the H level; hence, the relay 174B actuates the motor 164 to rotate in the direction in which the webbing tension is increased, thereby providing an effect similar to that offered by the first embodiment.

Figure 13:
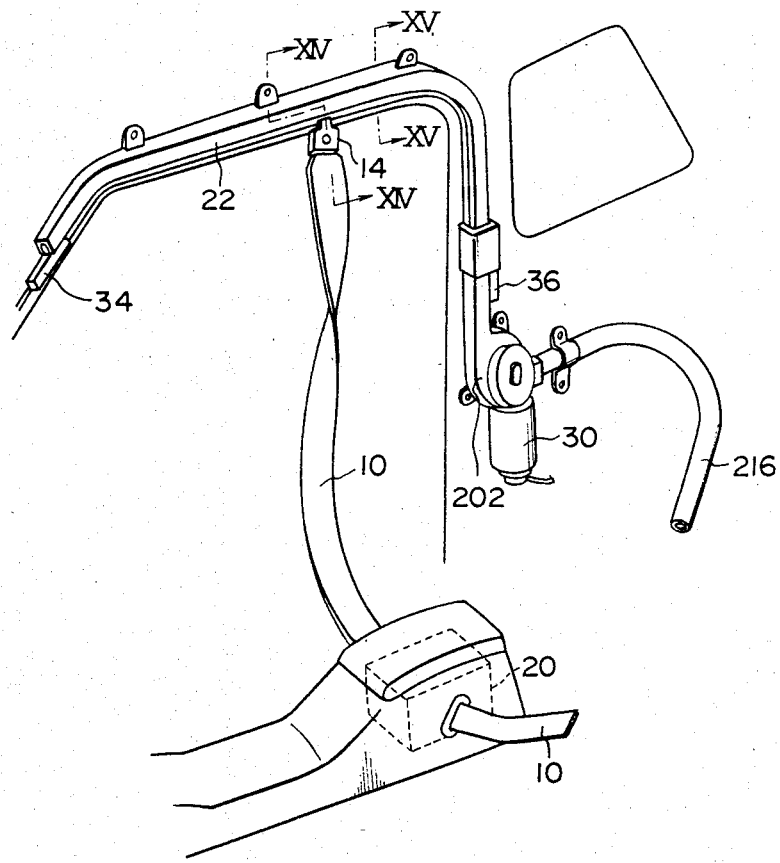
FIG. 13 is a perspective view of a third embodiment of the present invention.
Figure 14:
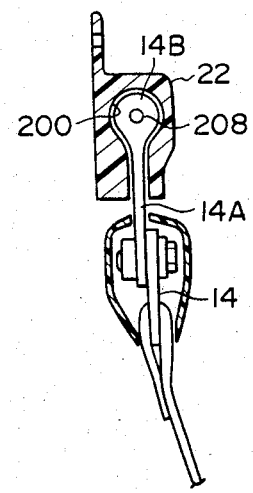
FIG. 14 is a sectional view taken along the line XIV—XIV of FIG. 13.
Figure 15:
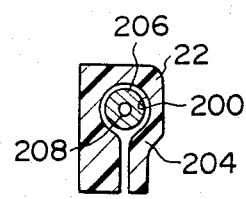
FIG. 15 is a sectional view taken along the line XV—XV of FIG. 13.

FIG. 13 shows another structure of the means for driving the shoulder anchor 14 in accordance with a third embodiment of the present invention. The guide rail 22, which is laid on the vehicle body similarly to that in the first embodiment, is, as shown in FIGS. 14 and 15, formed with a U-shaped groove 200 for receiving an enlarged-diameter portion 14B formed on the connecting plate 14A of the shoulder anchor 14. The opening of the U-shaped groove 200 is made narrow in width in order to prevent the connecting plate 14A from coming off from the guide rail 22.

Figure 16:
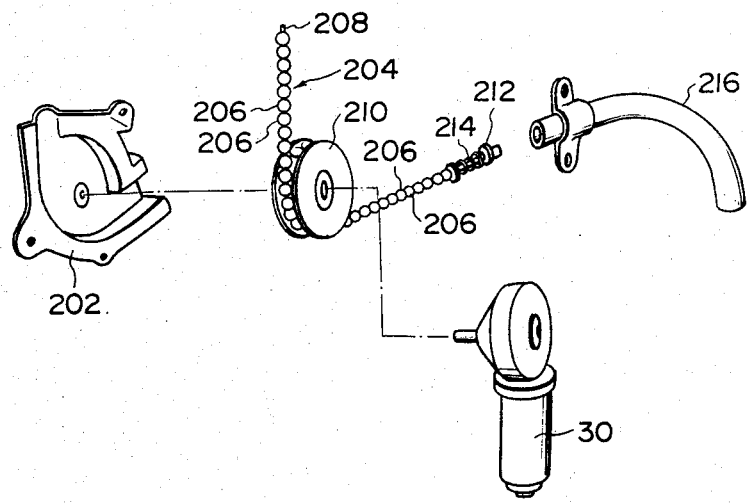
FIG. 16 is an exploded perspective view of a ball wire and a sprocket wheel.
Figure 17:
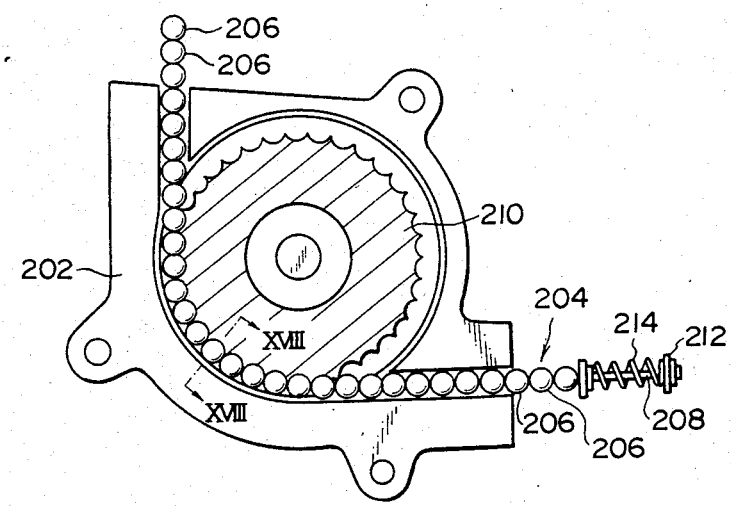
FIG. 17 is a sectional view showing how the ball wire is engaged with the sprocket wheel.
Figure 18:
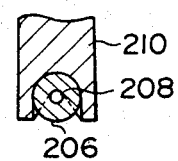
FIG. 18 is a sectional view taken along the line XVIII—XVIII of FIG. 17.

The U-shaped groove 200 is formed over the entire length of the guide rail 22 and is communicated with a sprocket housing 202 shown in FIGS. 16 and 17. On the other hand, the connecting plate 14A is connected with one end of a ball wire 204. The ball wire 204 is constituted by a plurality of balls 206 (made of a synthetic resin material, for example) and a wire 208 piercing the balls 206 at the centers thereof. The longitudinal intermediate portion of the ball wire 204 is received through the U-shaped groove 200 of the guide rail 22 while being restricted thereby and is then passed over a sprocket wheel 210 within the housing 202. The other end of the ball wire 204 is arranged as shown in FIGS. 16 and 17. More specifically, a compression coiled spring 214 is interposed between an end plate 212 secured to the end portion of the wire 208 and the endmost ball 206, whereby a compressive force is applied to the plurality of balls 206 in the direction in which they approach each other and they are pressed toward the shoulder anchor 14. It is to be noted that the other end of the ball wire 204 is received within a flexible tube 216 mounted on the vehicle body.

Thus, as the sprocket wheel 210 is rotated by the driving force of the motor 30, the ball wire 204 applies a tensile or compressive force to the shoulder anchor 14 in accordance with the rotational direction of the motor 30, thus causing the shoulder anchor 14 to move along the guide rail 22. In consequence, it is possible to attain an effect similar to that offered by the first embodiment.

It is to be noted that, although in the above-described embodiments a combination of the spiral spring 140, the worm wheel 138, the worm 142 and the motor 164 is employed as a means for varying the wind-up force of the webbing retractor 20, various kinds of resilient member and control means for varying the biasing force of the resilient member may be employed in the present invention. In addition, the means for driving the shoulder anchor 14 is not especially restricted to the driving structures shown in the above-described embodiments.

As described above, the seatbelt system in accordance with the present invention is arranged such that the biasing force of the resilient member for biasing the takeup shaft is decreased by the control means when the webbing is being automatically fastened to the occupant. Thus, it becomes possible to reduce the frictional resistance between the webbing and the body of the occupant when he is being fastened with the webbing.

What is claimed is:

1. A seatbelt system for preventing a movement of an occupant in a vehicle, comprising:
    (a) a webbing for restraining the occupant when the occupant seats himself in the vehicle;
    (b) driving means to which one end of said webbing is secured and which moves said one end of said webbing toward the front or rear end of the vehicle when the occupant enters or leaves the vehicle, said driving means including a guide rail lying on a side wall of the vehicle body, and moving said one end of said webbing moving along said guide rail;
    (c) a webbing retractor which is mounted on a floor member of the vehicle and provided with a takeup shaft for winding up the other end of said webbing;
    (d) a resilient member which biases said takeup shaft in a direction in which said webbing is wound; and (e) control means which reduces the biasing force of said resilient member when said one end of said webbing is moved toward the rear end of the vehicle, said control means reducing the biasing force of said resilient member when the following set of conditions is satisfied: said one end of said webbing is at an intermediate portion of said guide rail; the amount of said webbing wound off from said takeup shaft is below a predetermined value; and the webbing tension exceeds a predetermined value;

whereby said webbing is prevented from rubbing against the body of the occupant when said webbing is automatically fastened to the occupant.

2. A seatbelt system according to claim 1, wherein said guide rail is provided with switches which respectively detect from the position of said one end of said webbing the fact that said webbing has not yet been fastened to the occupant and the fact that said webbing has been fastened to the occupant, and said control means judges said one end of said webbing to be at an intermediate portion of said guide rail when neither of these switches detects said one end of said webbing.

3. A seatbelt system according to claim 1, wherein whether or not the amount of said webbing wound off from said takeup shaft is below a predetermined value is detected by a switch which detects whether or not the outside diameter of the portion of said webbing wound up on said takeup shaft is below a predetermined value.

4. A seatbelt system according to claim 1, wherein whether or not said webbing tension exceeds a predetermined value is detected by a switch which detects a repulsion force of said resilient member.

5. A seatbelt system which automatically fastens a webbing to an occupant of a vehicle, comprising:
(a) a guide rail laid on a side wall of the vehicle body in the longitudinal direction of the vehicle;
(b) an anchor member by which one end of said webbing is retained and which is movable along said guide rail;
(c) a continuous member which is received in said guide rail and has a portion thereof secured to said anchor member;
(d) driving means which causes a portion of said continuous member to move along said guide rail thereby to move said webbing toward the front or rear end of the vehicle;
(e) a webbing retractor which is provided in a central portion of the vehicle and is adapted to wind up the other end of said webbing by means of a biasing force; and
(f) control means which temporarily reduces said biasing force when said one end of said webbing is moved toward the rear end of the vehicle.

6. A seatbelt system according to claim 5, wherein said control means is provided with a webbing tension detection means and is adapted to reduce the biasing force of said resilient member when the webbing tension exceeds a predetermined value while said one end of said webbing is being moved.

7. A seatbelt system according to claim 5, wherein the end portion of said guide rail on the side thereof which is closer to the rear end of the vehicle extends downwardly, and said control means reduces the biasing force of said resilient member when said one end of said webbing moving toward the rear end of the vehicle reaches the downwardly extending end portion.

8. A seatbelt system according to claim 5, wherein said resilient member is a spiral spring which has one end thereof connected to said takeup shaft and the other end thereof connected to a motor which constitutes a portion of said control means.

9. A seatbelt system according to claim 5, wherein said control means reduces the biasing force of said resilient member when the following set of conditions is satisfied: said one end of said webbing is at an intermediate portion of said guide rail; the amount of said webbing wound off from said takeup shaft is below a predetermined value; and the webbing tension exceeds a predetermined value.

10. A seatbelt system according to claim 9, wherein said guide rail is provided with switches which are respectively disposed at the front and rear ends of said guide rail, and said control means judges said one end of said webbing to be at an intermediate portion of said guide rail when neither of these switches detects said anchor member.

11. A seatbelt system for a vehicle comprising:
(a) a webbing for restraining an occupant when the occupant seats in the vehicle;
(b) a webbing retractor which is provided in an approximately central portion of the vehicle and adapted to wind up the proximal portion of said webbing;
(c) driving means which retains the distal end of said webbing and moves said distal end toward the rear end of the vehicle after the occupant has entered the vehicle, thereby to automatically fasten said webbing to the occupant; and
(d) control means which reduces the wind-up force of said webbing retractor when the webbing tension exceeds a predetermined value while said distal end of said webbing is being moved by said driving means.

12. A seatbelt system for preventing a movement of an occupant in a vehicle, comprising:
(a) a webbing for restraining the occupant when the occupant seats himself in the vehicle;
(b) driving means to which one end of said webbing is secured and which moves said one end of said webbing toward the front or rear end of the vehicle when the occupant enters or leaves the vehicle;
(c) a webbing retractor which is mounted on a floor member of the vehicle and provided with a takeup shaft for winding up the other end of said webbing;
(d) a resilient member which biases said takeup shaft in a direction in which said webbing is wound, said resilient member being a spiral spring having one end thereof connected to said takeup shaft and the other end thereof connected to a motor constituting a portion of said control means; and
(e) control means which reduces the biasing force of said resilient member when said one end of said webbing is moved toward the rear end of the vehicle;

whereby said webbing is prevented from rubbing against the body of the occupant when said webbing is automatically fastened to the occupant.

13. A seatbelt system for preventing a movement of an occupant in a vehicle, comprising:
(a) a webbing for restraining the occupant when the occupant seats himself in the vehicle;
(b) driving means to which one end of said webbing is secured and which moves said one end of said webbing toward the front or rear end of the vehicle when the occupant enters or leaves the vehicle;

(c) a webbing retractor which is mounted on a floor member of the vehicle and provided with a takeup shaft for winding up the other end of said webbing;

(d) a resilient member which biases said takeup shaft in a direction in which said webbing is wound; and (e) control means which reduces the biasing force of said resilient member when said one end of said webbing is moved toward the rear end of the vehicle, said control means increasing the biasing force of said resilient member from the time when said webbing has been fastened to the occupant until the webbing tension reaches a predetermined value;

whereby said webbing is prevented from rubbing against the body of the occupant when said webbing is automatically fastened to the occupant.

* * * * *